United States Patent [19]

Estkowski et al.

[11] Patent Number: 4,763,383
[45] Date of Patent: Aug. 16, 1988

[54] ELECTRICALLY CONDUCTIVE CASTER HAVING LOOP DEPENDING RINGS

[75] Inventors: Michael H. Estkowski, St. Joseph; Christopher G. Estkowski, Coloma; Robert M. Shane, Berrien Springs, all of Mich.

[73] Assignee: Shepherd Products U.S., Inc., St. Joseph, Mich.

[21] Appl. No.: 1,812

[22] Filed: Jan. 8, 1987

[51] Int. Cl.[4] .............................................. B60B 33/00
[52] U.S. Cl. ...................................... 16/18 R; 361/219
[58] Field of Search .................... 16/18 R, 36, 47, 48; 361/212, 219, 220, 222, 223

[56] References Cited

U.S. PATENT DOCUMENTS

| 59,163 | 10/1866 | Barnes | 16/47 |
|---|---|---|---|
| 608,234 | 8/1898 | Slayton | 16/18 R X |
| 619,896 | 2/1899 | Lee | 16/18 R X |
| 907,104 | 12/1908 | Brower | 361/219 |
| 1,348,150 | 8/1920 | Cantelo | 16/36 X |
| 2,216,363 | 10/1940 | Crawford | 16/18 R |
| 2,318,340 | 5/1943 | Thatcher et al. | 361/219 |
| 2,533,403 | 12/1950 | Schultz | 16/18 R X |
| 2,891,273 | 6/1959 | Hutchinson | 16/36 X |
| 2,985,799 | 5/1961 | Steele | 361/219 |

Primary Examiner—Fred A. Silverberg
Attorney, Agent, or Firm—Mann, McWilliams, Zummer & Sweeney

[57] ABSTRACT

A caster with a constant electrically conductive path defined from the pintle to the surface on which the caster wheels are supported to prevent the build up of static charges which may generate sparks and uncontrolled voltage surges that may damage electronic components or cause combustion in volatile environments.

2 Claims, 3 Drawing Sheets

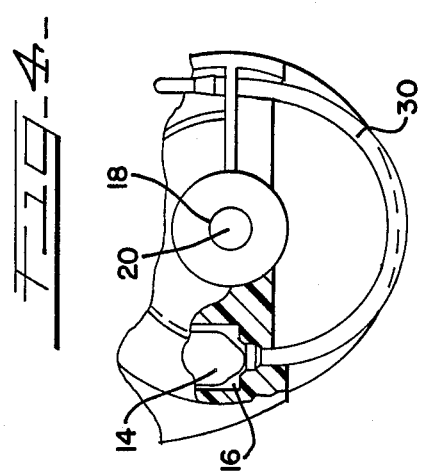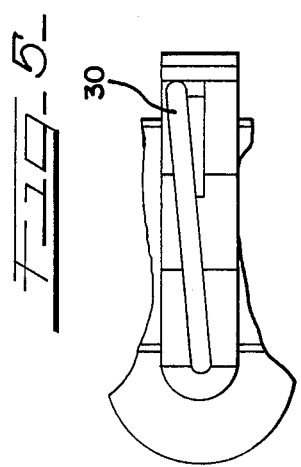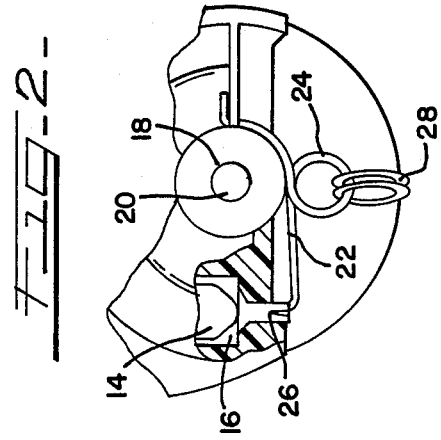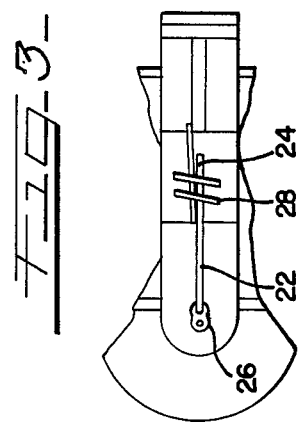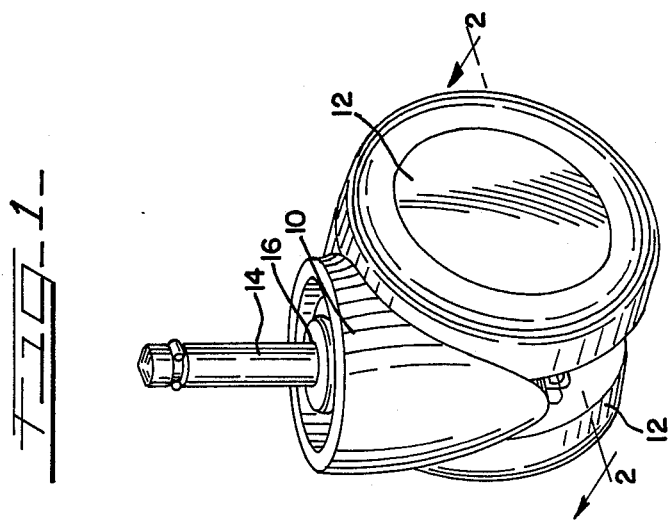

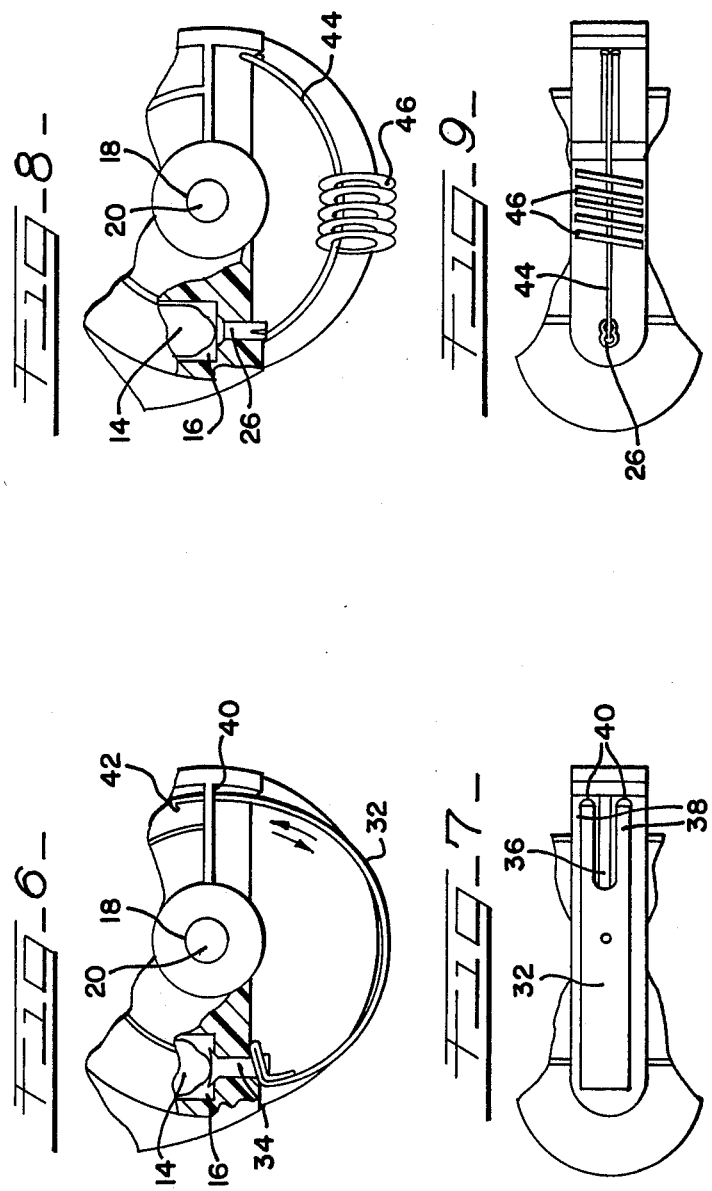

ELECTRICALLY CONDUCTIVE CASTER HAVING LOOP DEPENDING RINGS

BACKGROUND OF THE INVENTION

The present invention is directed to a caster including an electrostatic discharge arrangement providing an electrically conductive path between the article it supports and the surface on which it is supported thereby preventing sparks due to the build up of static electricity which may interfere with data transmission or storage on computers or damage components or cause an explosion in a volatile environment.

It is known in the art to provide electrical grounding contacts between vehicle bodies and the ground to maintain the vehicle body in electrical contact with the ground surface so that in case the vehicle should be electrically charged, the current will be conducted to the ground surface thus shielding the vehicle. See for example, the arrangements shown in U.S. Pat. Nos. 907,104, 1,999,414 and 2,549,471. In general, these arrangements consist of a dangling metallic chain connected at one end to a vehicle axle with the other end scraping along the ground surface. In at least one instance, the same approach was tried, unsuccessfully, with a caster. The difficulty encountered with trying to adapt the dragging chain method to a caster is that the dragging chain skips along the surface on which the caster rolls and sometimes is caught under the caster wheel and is torn off and often loses contact with the ground sometimes lodging inside the periphery of the caster wheel eliminating the conductive path. Since the links of the chain are connected in series, this presents additional difficulties. For a body ground device, see U.S. Pat. No. 2,712,098.

Some previous casters included enclosures that were intended to reduce the risk of a spark jumping from the caster to the ground. Some casters included antifriction arrangements as a means of avoiding the creation of sparks to some extent.

The most commonly used conductive casters previously used nonmetallic wheels impregnated with carbon, as carbon black or carbon fibre, whereby electrical charges were conducted away from the caster through the wheels themselves. The problem with such an arrangement was that after a period of use, they failed to function because dirt and wax built up on the surfaces of the wheels acting as an insulation, the result being that the conductive feature no longer functioned to draw off the electricity. Additionally, the introduction of carbon into wheel mold cavities is difficult to accomplish without material segregation causing the wheel to shrink unevenly and/or denigrating characteristics of the plastic materials. The use of carbon black can discolor the surface which the wheel contacts and also makes wheel colors other than black difficult to achieve.

SUMMARY OF THE INVENTION

The present invention provides a caster having a continuous electrically conductive path between the article which the caster supports and the surface the caster wheels contact thereby preventing the build up of static electricity. An electrically conductive mechanism is provided biasing a contact into engagement with the support surface such that contact is maintained between the conductive means and the surface to be contacted at all times.

BRIEF DESCRIPTION OF THE DRAWINGS

FIG. 1 is a perspective view of a dual wheel caster incorporating the principles of the present invention.

FIG. 2 is a sectional view of a dual wheel caster incorporating a spring support element with oval shaped contacts supported therefrom.

FIG. 3 is a bottom view of the arrangement shown in FIG. 2.

FIG. 4 is a sectional view of a modified embodiment of a dual wheel caster having an arched contact element.

FIG. 5 is a bottom view of the arrangement shown in FIG. 4.

FIG. 6 is a sectional view of a modified embodiment of a dual wheel caster incorporating an arched contact element.

FIG. 7 is a bottom view of the arrangement shown in FIG. 6.

FIG. 8 is a sectional view of a modified embodiment of a dual wheel caster having an arched support element with a plurality of circular contact elements supported therefrom.

FIG. 9 is a bottom view of the arrangement shown in FIG. 8.

FIGS. 10 through 13 show various shapes of contact elements which may be used in the present invention.

DETAILED DESCRIPTION OF THE INVENTION

Figure 14:
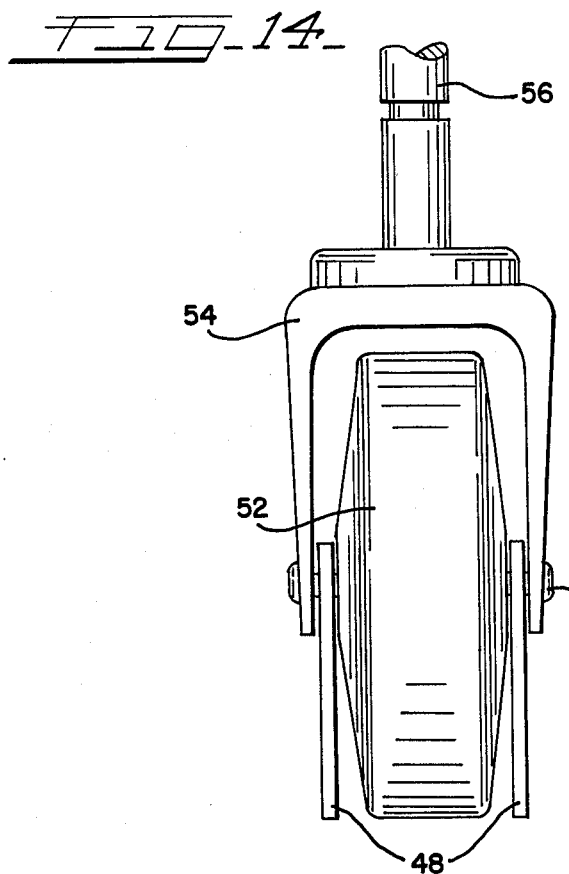
FIG. 14 shows a single wheel caster incorporating the features of the present invention with a pair of contacts, one suspended from each end of the axle.

FIG. 1 shows a dual wheel caster including a housing 10, a pair of caster wheels 12 and a pintle 14. The housing 10 and the caster wheels 12 may be constructed of thermoplastic or any other suitable nonconductive material. The pintle 14 is metal. A socket 16 is provided in the housing 10 into which the pintle 14 is inserted such that one end of the pintle 14 extends upwardly from the housing 10 whereby the extended end may be secured into the base of a chair or any other object to be supported by the caster. Referring to FIGS. 2, 4, 6 and 8, it can be seen that the other end of the pintle 14 extends nearly to the base of the housing 10. As further shown in FIGS. 2 through 8, the housing 10 is provided at the center of the base with an aperture 18 sized to receive an axle 20. The caster wheels 12 are secured about and supported by the axle 20.

FIG. 2 illustrates one embodiment of a caster designed to complete a conductive path from the pintle 14 to the surface upon which the caster is supported. An electrically conductive support element 22 is secured to the base of the housing 10. The support element 22 is formed of a single wire and is provided at the center with a loop 24. The support element 22 is secured at one end in a conductive retaining rivet 26 depending from the base of the housing 10. The retaining rivet 26 acts as a connector between the support element 22 and the pintle 14 and is crimped to retain the support element 22 within the retaining rivet 26. In a caster assembly having a metal housing, the retaining rivet 26 which acts as an electrical connection between the pintle 14 and the support element 22, is not necessary. The support element 22 is attached directly to the metal housing. The other end of the support element 22 is secured to the base of the housing 10 at the end opposite the retaining rivet 26.

The rivet 26 also functions as a seal to retain lubricant in the socket 16 for reduction of friction between the pintle and housing. The lower end of the pintle 14 impinges against rivet 26 which creates intimate contact between rivet and housing surfaces resulting in a sealing interface thereby preventing the escape of lubricant from the lower end of the socket 16.

Disposed from the loop 24 of the support element 22 are a plurality of conductive contact elements 28. Although the loop 24 is shown as being circular, it may be any shape which will confine the contact elements 28 so that they do not bounce out of contact with the carpet or other support surface into the clearance space between the wheel 12 and the housing 10. The loop 24 also maintains the operating range of contact elements 28 within its confines. The sizing of the contact elements 28 and the spacing between the wheels is such that the contact elements, even though they may touch the wheels when moving from side to side, cannot enter the wheel-ground interface. Such an arrangement maximizes the electrical connection between the support surface and the pintle and ensures a constant electrically conductive path.

As shown in FIGS. 10 through 13, the contact elements 28 may be of various shapes so long as they are bilaterally symmetrical and are provided with an aperture on the median axis just large enough to prevent the contact element 28 from becoming lodged in the wheel recess as the wheel rotates. The internal diameter of the contact elements 28 is dictated by the distance between the caster wheels 12 and controls the lateral movement of the contact elements 28. Linear movement of the contact elements 28 is restricted by the loop 24 thereby reducing any consequential fatigue of the support element 22 since flexing at the support element 22 attachment points does not occur. The weight of the contact elements 28 provides a force biasing the contacts into engagement with the support surface so as to ensure continuous contact and an uninterrupted discharge path. The weight of the elements determines the contact pressure applied to the floor surface. Any number of contact elements 28 may be used as more contact elements 28 increase the conductivity so long as a plurality of contacts are used. The benefit provided by plural contacts, effectively electrically connected in parallel, is to ensure that so long as any individual contact element touches the ground, the path remains intact.

During caster movement, the contact elements 28 move in a curvilinear fashion until the force pushing them equals their weight. This equilibrium point changes as the floor surface changes. The contact force is relatively consistent when the caster is static, however, during movement the contact force fluctuates as the contact elements 28 move to accommodate irregularities encountered on the surface upon which the caster is rolling. When an obstacle is encountered, the contact elements 28 are free to navigate over or around it without binding or jamming under the wheel 12.

Futher embodiments of electrostatic discharge arrangements for casters are shown in FIGS. 4 through 8. FIGS. 4 and 5 illustrate a dual wheel caster having a cylindrical contact element 30 disposed between the caster wheels 12. One end of the contact element 30 is secured through the base of the housing 10 into the socket 16 to the pintle 14. The other end is secured in the base of the housing 10 at the opposite end. The contact element 30 is a single circular arched piece of elastic conductive material with high abrasion resistance and is oriented tangential to the floor surface and resiliently biased into engagement therewith. A closely coiled spring (not shown) may be placed over the contact element 30 to eliminate wear on the contact surface, thereby increasing durability. The same general lubricant retaining mechanism is operative in this embodiment as previously described for the embodiment of FIG. 2.

Another embodiment shown in FIGS. 6 and 7 provides a dual wheel caster with a contact element 32 which is an arched, flattened strip of conductive material secured at one end to a retaining rivet 34 connecting the contact element 32 to the pintle 14. The other end of the contact element 32 is provided with a slot 36, as seen in FIG. 7. The slot 36 separates a pair of prongs 38 which are inserted into aperture 40 provided in the base of the housing 10 opposite the pintle 14. The ends 42 of the prongs 38 are hooked to prevent the prongs 38 from slipping out of the aperture 40. This provides a resilient arrangement whereby the contact element 32 is biased into engagement with the support surface. If an obstacle is encountered, the contact element 32 will move freely in an upward direction within the limits defined by the slot 36 and then return to its ground engaging relationship. This arrangement is highly abrasion resistant and very conductive offering little or no resistance to current flow.

The embodiment shown in FIGS. 8 and 9 is similar to the preferred embodiment shown in FIG. 2, the difference being that the support element 44 incorporated in the FIG. 8 embodiment is not looped, but is arched throughout its length, thereby permitting the contact elements 46 to move freely in a linear direction along the length of the support element 44.

FIG. 14 shows an electrostatic discharge arrangement adapted for use with single wheel casters. A pair of conductive contact elements 48 are suspended, one at either end of the axle 50, between the caster wheel and conductive horn 54 which forms part of the housing. The contact elements 48 are electrically connected to the pintle 56 through the axle 50 and the horn 54. Two contact elements 48 are used to ensure that the conductive path remains constant. If, for example, the wheel 52 pivots and shifts to one side of the horn 54, it is possible that it will trap the contact element 48 disposed on that side against the horn 54 and rotate it out of contact with the ground. In such a situation, the other contact element would remain loose and continue to engage the ground. The weight of the contacts and their loose mounting on the axle biases the contacts into engagement with the support surface.

Figure 15:
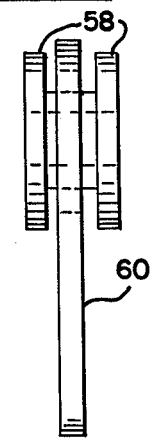
FIG. 15 shows a containment guide for use with a contact element and a single wheel caster such that only one contact element is required.
Figure 16:
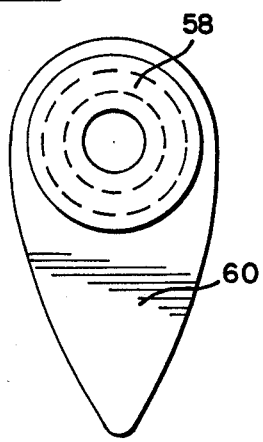
FIG. 16 is a side view of the containment guide of FIG. 15.

FIGS. 15 and 16 illustrate a containment guide or spacer 58 for use with a single wheel caster whereby only one contact element 60 is required. The containment guide 58 is essentially a grommet of conductive material which supports the contact element 60 on the axle and is disposed between the wheel and the horn. The containment guide 58 spaces the wheel from the contact element 60 and prevents the contact element 60 from pivoting out of engagement with the support surface.

Thus it has been shown that the present invention provides an electrostatic discharge arrangement for casters so that a constant electrically conductive path is provided from the article to be supported to the surface the caster wheels contact.

Various features of the invention have been particularly shown and described in connection with the illustrated embodiment of the invention, however, it must be understood that these particular arrangements merely illustrate and that the invention is to be given its fullest interpretation with the terms of the appended claims.

What is claimed is:

1. A dual wheel conductive caster which provides an electrically conductive path between the article it supports and the surface on which it is supported including a housing, an electrically conductive pintle associated with said housing with one end adapted to be inserted into a socket in the article to be supported, an axle disposed in said housing, a pair of caster wheels, one caster wheel supported on each end of said axle, an electrically conductive support element consisting of a metallic wire member disposed between said wheels and electrically connected at one end to said pintle and at the other end to said housing, said support element disposed above the surface on which said caster wheels are supported, said support element defining a loop between its ends and toward the center thereof and a plurality of annular conductive contact elements concentrically arranged adjacent each other and suspended from said loop and electrically connected to said support element in parallel and biased into engagement with said support surface whereby an electrically conductive path is defined between said pintle and said support surface through said support element and said contact elements thereby ensuring that said article supported by said caster and said support surface are at the same level of electric charge.

2. A dual wheel conductive caster as in claim 1 in which an interface is defined between said caster wheels and said support surface, said support element is positioned and said conductive contact elements are sized such that contact between said contact elements and said interface is precluded.

* * * * *